US006932183B2

(12) United States Patent
Jeppe et al.

(10) Patent No.: US 6,932,183 B2
(45) Date of Patent: Aug. 23, 2005

(54) CONTROL APPARATUS FOR AN AGRICULTURAL MACHINE

(75) Inventors: Eckehard Jeppe, Hofgeismar (DE); Georg Eggenhaus, Saerbeck (DE); Peter Hieronymus, Schlosse Holte (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 126 days.

(21) Appl. No.: 10/229,241

(22) Filed: Aug. 27, 2002

(65) Prior Publication Data

US 2003/0037985 A1 Feb. 27, 2003

(30) Foreign Application Priority Data

Aug. 27, 2001 (DE) ........................................ 101 40 975

(51) Int. Cl.[7] ................................................ B60K 26/00
(52) U.S. Cl. ........................................................ 180/333
(58) Field of Search ................................ 180/333, 334; 74/471 XY

(56) References Cited

U.S. PATENT DOCUMENTS

| | | | | | |
|---|---|---|---|---|---|
| 5,161,422 | A | * | 11/1992 | Suman et al. | 74/335 |
| 6,425,729 | B1 | * | 7/2002 | Coutant | 414/685 |
| 6,446,747 | B1 | * | 9/2002 | Muller et al. | 180/334 |
| 6,550,562 | B2 | * | 4/2003 | Brandt et al. | 180/333 |
| 6,694,236 | B2 | * | 2/2004 | Onodera | 701/36 |

FOREIGN PATENT DOCUMENTS

| | | |
|---|---|---|
| DE | 19619419 | 11/1997 |

* cited by examiner

*Primary Examiner*—Faye M. Fleming
(74) *Attorney, Agent, or Firm*—Husch & Eppenberger, LLC; Robert C. Haldiman

(57) ABSTRACT

A control apparatus for an agricultural machine operatively arranged in an operator's cab proximate an operator having a multi-functional handle. The multi-functional handle has a gripping portion with a plurality of control elements. The control elements are operatively arranged such that the operator can reach the control elements with one or two fingers while holding the gripping portion. A selection/transfer element is used to select control elements to perform a first and a second control function. A display unit is used to display the function symbols of the selected function.

24 Claims, 3 Drawing Sheets

CONTROL APPARATUS FOR AN AGRICULTURAL MACHINE

TECHNICAL FIELD OF THE INVENTION

The invention relates to the field of agricultural machinery and, more specifically, to a control apparatus for an agricultural machine.

DESCRIPTION OF THE RELATED ART

DE 196 19 419 A1 discloses a control device for an agricultural machine including a multi-functional handle arranged in an operator's cab. The multi-functional handle has a gripping portion with a plurality of control elements. The control elements have a first control for performing a function (e.g., raising and lowering a cutterbar). In addition, there is a separate control panel with an electronic display unit associated with it, wherein the control panel has additional control elements for setting second control functions, which cannot be actuated by control elements of the multi-functional handle. The control functions which can be set by the control elements of the control panel are displayed by function symbols in the electronic display unit, so that the setting of the second control functions can easily be checked. To increase the operational convenience and reliability of the device, the first control functions are allocated to the multi-functional handle and are used relatively frequently by the operator. In contrast, the second control functions are not actuated by the multi-functional handle and are used less frequently. These second control functions include, for example, control functions which do not have to be performed while moving.

A menu control button operatively connected with a display element is integrated with the multi-functional handle. Different control functions can be allocated to the control elements of the multi-functional handle. As a result, the number of control elements on the multi-functional handle can be substantially reduced. The drawback is that the display unit must meet requirements to guarantee operational reliability.

The present invention is directed to overcome one or more of the problems as set forth above.

SUMMARY OF THE INVENTION

In accordance with the present invention there is provided a control apparatus for controlling certain functions of an agricultural machine having an operator's cab, and including a multi-functional handle having a gripping portion with a plurality of control elements reachable with one or two fingers when the operator's hand is on the multiple-functional handle; a selection/transfer control element having a first position for selecting one of the control elements for performing a first function; and the selection/transfer control element having a second position for selecting another of the control elements for performing a second function.

The controls are conveniently located in the operator's cab of an agricultural machine.

In another aspect of the invention, there is a control apparatus operatively arranged proximate to an operator in an operator's cab of an agricultural combine harvester for controlling functions of the agricultural combine harvester, the controlling accomplished by at least one finger of the operator, comprising a multi-functional handle having a gripping portion with a plurality of control elements for a portion of the control apparatus proximate the operator; a first control as one of the plurality of control elements of the multi-functional handle; and a multiple control element as one of the plurality of control elements of the multi-functional handle having at least one selection/transfer control element; and function symbols for designating certain functions of the agricultural combine machine, wherein actuation of one of the selection/transfer control elements sets the function symbols to a desired first function and the first control or the multiple control element effects the function.

In still another aspect of the invention, a selection/transfer control element and control functions actuated to control elements of the multi-functional handle are enabled. The adjusting functions of a harvesting machine are rarely actuated, (e.g., swinging the grain tank pipe, adjusting the cutterbar table length or adjusting the cutterbar cutting angle) and are easily actuated by a single selection/transfer control element to one or more control elements, which are preferably designed as multiple control element of the multi-functional handle. After setting the desired control function with the selection/transfer control element, the driver can actuate the corresponding control function on the corresponding control element of the multi-functional handle without having to take his hand off the multi-functional handle. The selection/transfer control element is arranged, for example, on the steering wheel or left armrest in the operator's cab proximate the operator, so it can be actuated by a left hand or foot without having to remove one's right hand from the multi-functional handle. Alternatively, the selection/transfer control element is mounted on the multi-functional handle, so the operator can control the agricultural machine with only the right hand.

In yet another aspect of the invention, there is a control apparatus having a multi-functional handle with a multiple control element. There is a first control function for periodic use remotely mounted. A selection/transfer control element is arranged on the multi-functional handle. The selection/transfer control element is used to select a first or second control function. By actuation of the selection/transfer control element, there is direct allocation of the control function to the multiple control element, so that selection and confirmation of the control function take place simultaneously. As a result, setting of the corresponding control function is substantially simplified.

In yet another aspect according to the invention, a selection/transfer control element is designed as a multiple switch. The multiple switch allows actuation of the first control function at a first position and the second control function at a second position. Advantageously, the multiple switch in the first position is easily accessible and moved with less resistance than when the multiple switch is in the second position. This allows the operator to manipulate the multiple switch to the first control function without looking.

In yet another aspect of the invention, the multiple switch is a rotary switch having switch positions, each allocated a function symbol.

In still another aspect of the invention, the rotary switch is a knurled wheel protruding through a central region of a recess of a gripping portion of the multi-functional handle. The knurled wheel has control functions, each allocated a latch position. The latch position allocated to the first control function is preferably made stronger than the latch position allocated to the second control function, so that the operator can also quickly and easily move the switch back into the switch position allocated to the first control function.

In still another aspect of the invention, the rotary switch has latch positions activated or discerned by touch. The different controls are also discerned by touch differently. In this way, the operator is able to control and change control functions via the multi-functional handle without looking at it.

The above aspects are merely illustrative and should not be construed as all-inclusive and limiting to the scope of the invention. The aspects and advantages of the present invention will become apparent, as it becomes better understood from the following detailed description when taken in conjunction with the accompanying drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
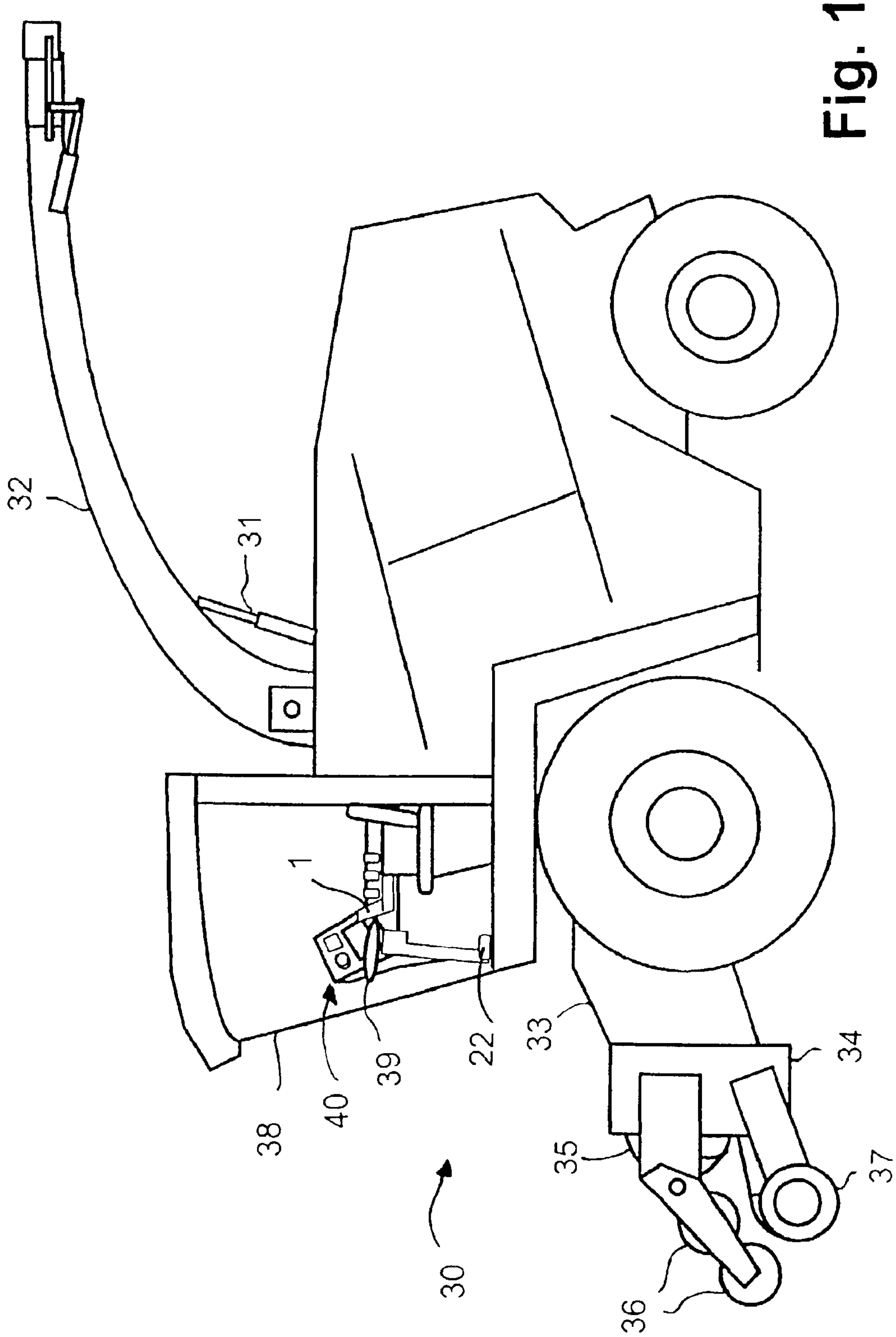
FIG. 1 is a side view of an agricultural machine.

Referring now to the drawings, FIG. 1 shows an agricultural machine in the form of a forage harvester 30; however, the embodiment of the invention can be used with other types of agricultural machines (e.g., combine harvesters). The forage harvester 30 has a transfer pipe bend 32 operatively attached thereto and actuated by a hydraulic cylinder 31. The forage harvester 30 has a pick-up unit 34 operatively connected to a chassis by a feed unit 33. The pick-up unit 34 is operatively attached to a header auger 35, roller hold-down devices 36 and a support wheel 37.

Figure 2:
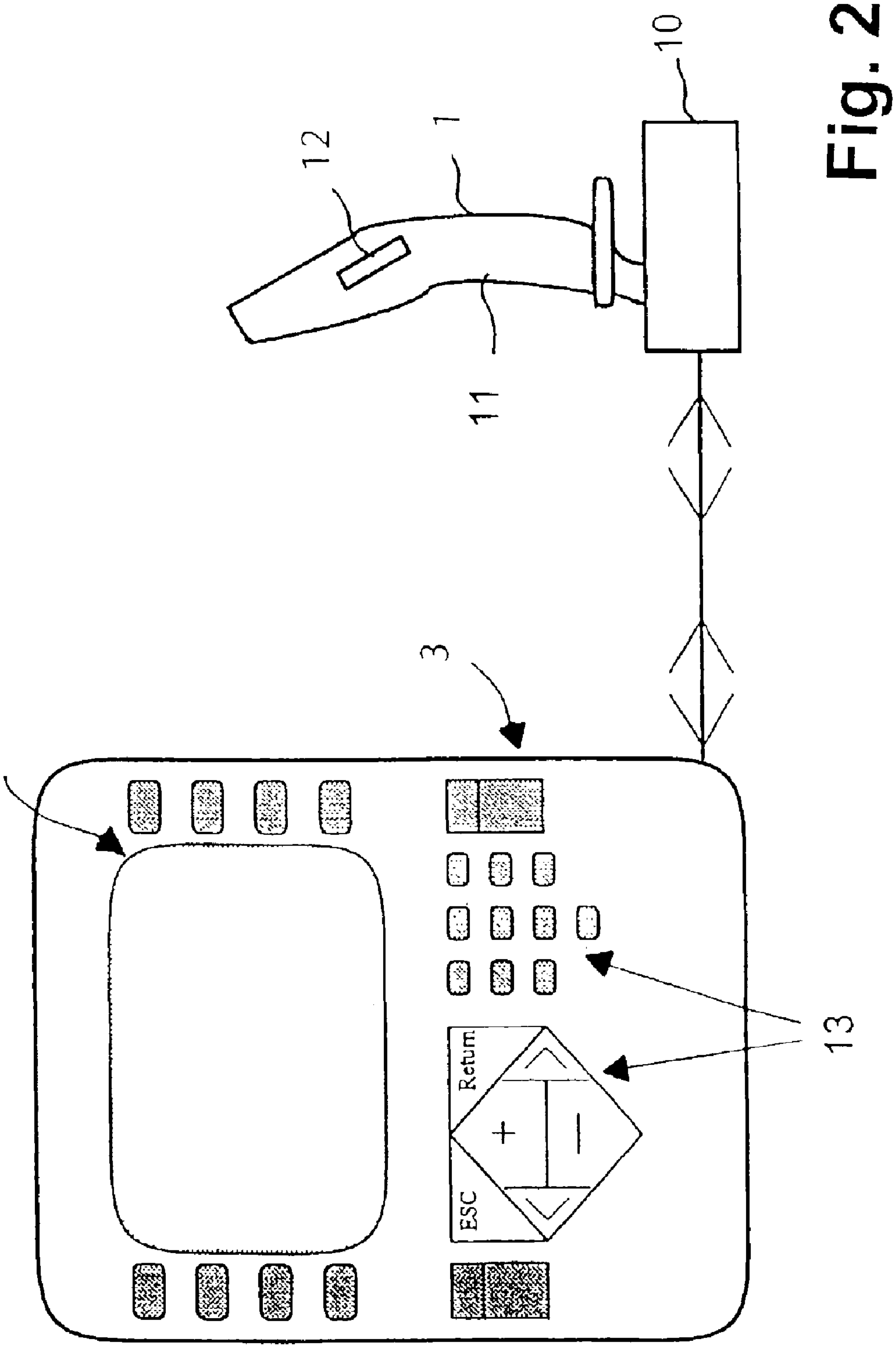
FIG. 2 is a side view of a control apparatus operatively arranged in a driver's cab of the agricultural machine.

The forage harvester 30 has an operator's cab 38. A steering wheel 39 and a plurality of control elements 40 for controlling the transfer pipe bend 32, the pick-up unit 34, the header auger 35, the roller hold-down devices 36 and the support wheel 37 are operatively mounted in the operator's cab 38. In the preferred embodiment, the control elements 40 are electrical or electro-mechanical adjusting units (not shown). A multi-functional handle 1 and a selection/transfer control element 12 are operatively arranged in the operator's cab 38. The multi-functional handle 1 is arranged at a location so that the operator can grip it with his right hand and actuate various control elements described herein with a few fingers. The selection/transfer element 12 is used to designate the desired control function. The selection/transfer control element 12 may be arranged in a foot region as a pedal switch 22, on the steering wheel 39, on a left armrest, or on the multi-functional handle 1. FIG. 2 shows an electronic display unit 2 having a monitor and a control panel 3.

The following description describes the controlling and actuating of a combine harvester; however, the description is also applicable to the forage harvester 30.

Figure 3:
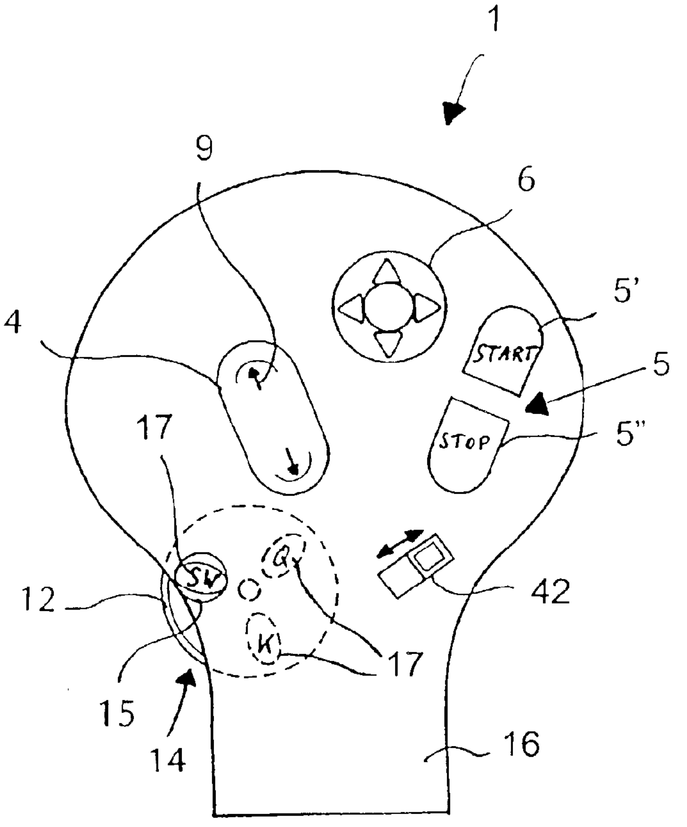
FIG. 3 is a top view of a multi-functional handle.
Figure 4:
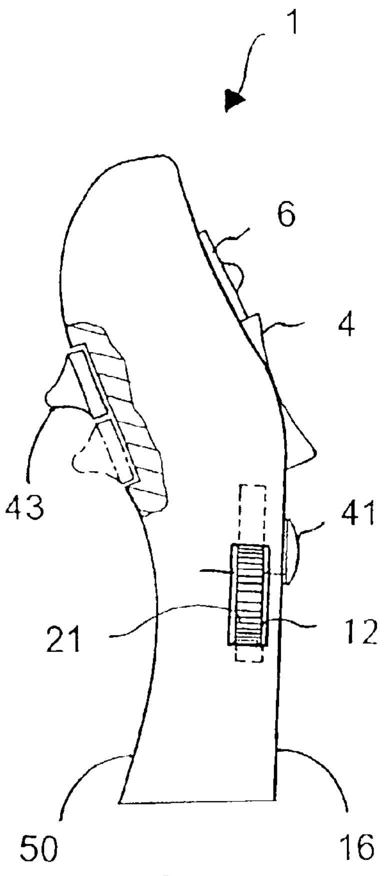
FIG. 4 is a side view of the multi-functional handle.

Turning now to FIGS. 3 and 4, the multi-functional handle 1 has a plurality of handle control elements 4, 5, 6 arranged in an upper region of a gripping portion 11 of the multi-functional handle 1. Advantageously, the corresponding control elements 4, 5, 6 are arranged in a common face or plane on the gripping portion 11, so that they can easily be reached by an operator's finger. The handle control elements 4, 5, 6 perform first control functions that are actuated relatively frequently when the combine harvester is moving and during its harvesting function. The handle control elements 4, 5, 6 are preferably rocker or toggle switches. One of the handle control elements 4, 5, 6 is a cutterbar control element 4 in the form of a double control element. The cutterbar control element 4 is elliptical and actuated in opposite end regions to raise or lower a cutterbar of a combine harvester. Function symbols are shown by arrows 9. A start/stop or on/off element 5 in direct functional connection with the multiple control element 4 controls switching the cutterbar on or off. Similarly, a reel control element 6 controls raising and lowering a reel, but also has other functions as implied by the four arrows. Upon actuation of the arrow pointing upward or the arrow pointing downward, the reel is raised or lowered, respectively. Upon actuation of the left arrow or the right arrow, the reel is moved forward or backward, respectively.

As shown in FIG. 2, the multi-functional handle 1 is operatively and movably mounted in a support housing 10 to control a direction of travel by moving the handle laterally. Like an accelerator, speed of travel of the combine harvester can be controlled by pushing the multi-functional handle 1 forward or pulling it back.

The gripping portion 11 has a selection/transfer control element 12 arranged thereon. The selection/transfer control element 12 has three switch positions designated by function symbols 17. The selection/transfer control element 12 is used to select the desired control function 17 (i.e., SW, K, Q) and activates the appropriate control 4, 5, 6 to perform the desired function. When the function symbol 17 is set at SW, the handle control element 4 is activated and a first control function (basic function), namely, raising/lowering the cutterbar can be performed. In addition, the function symbol 17 can be set at Q or K, which are secondary control functions. The secondary control functions concern the setting of adjusting units, which are used less frequently and are usually performed by control elements 13 of control panel 3.

As shown in FIGS. 3 and 4, the selection/transfer control element 12 is in the form of a rotary switch, which in a side region protrudes through a slot-like recess in the gripping portion 11. A partially exposed region 14 serves for gripping and rotating the selection/transfer control element 12 to select the function symbol 17. The function symbol 17 is displayed through a circular opening 15 on a front side 16 of the gripping portion 11, thus indicating the current switch position. A lens 41 conveniently covers and magnifies the selected function symbol 17. In an alternative embodiment, the function symbol 17 is illuminated.

In one embodiment, the selection/transfer element 12 includes a knurled or grooved wheel having a latch position in which the selected function symbol 17 is shown through the circular opening 15, thereby showing the selected control function. In the illustrated embodiment, the selection/transfer control element 12 has a grooved surface structure 21 on the circumferential surface and can be discerned by touch. In an alternative embodiment, the switch positions can be discerned by touch because of the shape of the protruding partial region 14. The partial region 14 may be slightly concave in a first switch position and slightly convex in another switch position. In an alternative embodiment of the selection/transfer control element 12, there may be a stop (not shown). The stop allows the function SW to be selected when the selection/transfer control element 12 is rotated to the stop position.

In an alternative embodiment shown in FIG. 3, the selection/transfer control element 12 is a sliding switch 42 having various switch positions. The sliding switch 42 is movable in the linear direction between two positions. In the preferred embodiment, there is a first switch position places the sliding switch 42 is an automatic mode, and a second switch position places the sliding switch 42 in a manual mode. The manual mode can be use to select the start/stop element 5 and reel control elements 6. The sliding switch 42 can have a number of switch positions and each position can be labeled with the function symbols 17 to indicate the selected control function.

In an alternative embodiment, the function symbols 17 are alternatively or additionally displayed in the electronic display unit 2. The electronic display unit 2 allows simple allocation of control functions 17 to the multiple control element 4 on the multi-functional handle 1. The operator need only look at the ergonomically arranged electronic display unit 2. For this purpose, it is sufficient that the selection/transfer control element 12 is located by feel or touch to allow easy gripping thereof. By actuation of the selection/transfer control element 12, the desired setting or allocation of the control function is selected.

Advantageously, a large proportion of the control functions is placed on the multi-functional handle 1. In this case, the second control function is allocated directly to a switch position of the selection/transfer control element 12.

FIG. 4 shows an alternative embodiment having a second selection/transfer control element 43 arranged on a rear side 50 of the gripping portion 11. The second selection/transfer control element 43 is a sliding element and serves to allocate given control functions to the control elements 4, 5 and/or 6. In a first position of the second selection/transfer control element 43, stopping and reversing of the feed unit 33 is effected by actuation of the button 5'. In a second position of the second selection/transfer control element 43, pivoting of the roller hold-down device 36 is effected upon actuation of the button 5' simultaneously with reversing. Before each reversing operation, the operator can move the second selection/transfer control element 43 to the desired function without removing his hand from the multi-functional handle 1.

The selection/transfer control element 12 is used to select functions performed frequently, and the second selection/transfer control element 43 is used to select functions performed less frequently. For example, the less frequent functions are the actuation of swinging the grain tank pipe, adjusting the cutterbar table length, adjusting the manual transverse tilt of the cutterbar or adjusting the cutting angle of the cutterbar. Alternatively, it is also possible with the selection/transfer control elements 12 and the second selection/transfer control element 43 to directly allocate set values of the harvesting machine which must likewise be adjusted only from time to time in working mode, to the control elements 5, 6.

As shown, the selection/transfer control element 12 and the second selection/transfer control elements 43 are arranged directly on the gripping portion 11. Alternatively, they can be arranged in the area proximate the operator within the operator's cab 38 (e.g., a foot region). Advantageously, the selection/transfer control element 12 and the second selection/transfer control element 43 are allocated to certain fixed control elements 4, 5, 6. In this way, it is ensured that the operator allocates the control functions, which may be preselected by the selection/transfer control elements 12 and the second selection/transfer control elements 43 to the control elements 4, 5, 6 concerned. This is advantageously brought about by locating the selection/transfer control element 12 and the second selection/transfer control element 43 in the vicinity of the corresponding control elements 4, 5, 6. This functional linking is additionally assisted by markings (e.g., connecting lines) on the gripping portion 11.

While preferred embodiments have herein been illustrated and described, this has been done by way of illustration only, and the invention should not be limited except as required by the scope of the appended claims.

What is claimed is:

1. A device for control of an agricultural machine which is arranged in an operator's cab in proximity to the operator, including a multi-function handle comprising a gripping portion having a plurality of control elements, the control elements being so constructed and arranged that they can be reached reliably with one or two fingers of a hand of the operator resting on the gripping portion, the control elements serving to control a first function of a first element of the machine, the device further comprising:

one of the control elements of the multi-function handle having a selection element having another setting for control of at least one further function of a second element of the machine such that said multifunction handle controls said first function of said first work element when said selection element is in a first position and said multifunction handle controls said at least one further function of said second work element when said selection element is in a second position.

2. In an agricultural machine having a plurality of work elements, each of said work elements having separate functions, said separate functions being selectively operable by a control element, a control apparatus configured for location in an operator's cab in a position proximate the operator, the control apparatus comprising:

a multifunction handle having a gripping portion;

a first control element on said multifunction handle;

at least one other control element on said multifunction handle;

each of said control elements being adapted to operatively connect with at least one of said plurality of working elements of the agricultural machine to control one of said separate functions of said one work element;

a selection element having a first position wherein said first control element is operatively connected with one of said working elements such that use of said first control element controls one of said separate functions of said one of said working elements; and said selection element having a second position wherein at least one other control element is operatively connected with another of said working elements such that use of said at least one other control element controls another one of said separate functions of said another of said work elements.

3. The control apparatus of claim 2 wherein when said selection element is in said second position, said first control element is operatively connected with another of said plurality of working elements such that use of said first control element remotely operates said another of said plurality of work elements.

4. The control apparatus of claim 4 wherein when said selection element is in said second position, said first control element is not operatively connected with said one of said plurality of work elements.

5. In an agricultural combine having a cutter bar, a cutter bar table, and a reel, a multifunction control, said multifunction control comprising:

a handle, said handle being moveable between positions, said movement of said handle being adapted to operatively connect to control one of a plurality of functions of one of said cutter bar, said cutter bar table and said reel;

at least one control button on said handle, said control button being moveable between positions, said movement of said control button being adapted to operatively connect to control another of one of said plurality of functions of one of said cutter bar, said cutter bar table or said reel, a selection control on said handle, said selection control being adjustable between a first, a second and a third position such that when said selection control is in said first position said movement of said handle controls a first function of said cutter bar and said movement of said control button controls a second function of said cutter bar, and such that when said selection control is in said second position, said movement of said handle or said control button controls a first function of said cutter bar table, and such that when said selection element is in said third position, said movement of said handle controls a first function of said reel and said movement of said control button controls a second function of said reel.

6. The control device of claim 1 further comprising:

a display, said display being in operative communication with said selection element and said display being configured to display a currently selected work element.

7. The control device of claim 1 wherein said selection control is a switch.

8. The control device of claim 7 wherein said switch is selected from the group consisting of: a rotary switch, a sliding switch, a rocker switch, and a toggle switch.

9. The control device of claim 7 wherein said switch has at least two positions.

10. The control device of claim 1 wherein said selection control includes functional symbols associated with each position of said selection control, said functional symbols corresponding to a work element selection.

11. The control device of claim 1 wherein said selection control includes functional symbols associated with each position of said selection control, said functional symbols corresponding to a function selection.

12. The control device of claim 1, wherein said selection control is a knurled wheel.

13. The control device of claim 1, wherein said positions of said selection control are discerned by touch.

14. The control device of claim 1, wherein said control further comprises a stop.

15. The control device of claim 11 or 12, wherein said functional symbols are illuminated.

16. The control device of claim 1 further comprising a control panel, said control panel including at least one of said plurality of control elements.

17. The control device of claim 1 wherein said first functions controlling said first work element are operated with the same control elements as said further functions of said second work elements.

18. The control device of claim 1 wherein said first functions of said first work element are controlled with different control elements from said further functions of said second work element.

19. The multi-function control of claim 5 wherein said plurality of functions of said cutter bar includes moving said cutter bar up and down and turning said cutter bar on and off, adjusting a transverse tilt of said cutter bar, and adjusting a cutting angle of said cutter bar.

20. The multi-function control of claim 5 wherein said plurality of functions of said reel include moving said reel up and down and moving said reel forward and backward.

21. The multi-function control of claim 5 wherein said plurality of functions of said cutter bar table include adjusting a length of said cutter bar table.

22. The multi-function control of claim 5 wherein said multi-function control is adapted to operatively connect to a roller hold down device and said plurality of functions includes pivoting said roller hold down device.

23. The multi-function control of claim 5 wherein said multi-function control is further adapted to operatively connect to a grain tank pipe and said plurality of functions include swinging said grain tank pipe.

24. The multi-function control of claim 5 wherein said multi-function control is adapted to operatively connect to a feed unit and said plurality of functions includes stopping said feed unit and reversing said feed unit.

* * * * *